US012619435B2

(12) United States Patent
Kleen et al.

(10) Patent No.: US 12,619,435 B2
(45) Date of Patent: May 5, 2026

(54) VIRTUAL IDLE LOOPS

(71) Applicant: Intel Corporation, Santa Clara, CA (US)

(72) Inventors: Andreas Kleen, Portland, OR (US); Jason W. Brandt, Austin, TX (US); Gilbert Neiger, Portland, OR (US); Ittai Anati, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/953,486

(22) Filed: Sep. 27, 2022

(65) Prior Publication Data

US 2024/0103868 A1    Mar. 28, 2024

(51) Int. Cl.
    *G06F 9/30* (2018.01)
    *G06F 9/455* (2018.01)
(52) U.S. Cl.
    CPC ........ *G06F 9/3016* (2013.01); *G06F 9/30065* (2013.01); *G06F 9/45558* (2013.01); *G06F 2009/45591* (2013.01)
(58) Field of Classification Search
    CPC ............. G06F 9/30065; G06F 9/45558; G06F 9/3016; G06F 2009/45591
    USPC ........................................................ 712/208
    See application file for complete search history.

(56) References Cited

U.S. PATENT DOCUMENTS

| | | | |
|---|---|---|---|
| 4,352,869 A | 10/1982 | Mellors | |
| 4,412,281 A | 10/1983 | Works | |
| 4,415,969 A | 11/1983 | Bayliss et al. | |
| 5,506,073 A | 4/1996 | Angell et al. | |
| 5,714,279 A | 2/1998 | Zajac, Jr. et al. | |
| 6,009,488 A | 12/1999 | Kavipurapu | |

(Continued)

FOREIGN PATENT DOCUMENTS

| | | |
|---|---|---|
| CN | 108011883 A | 5/2018 |
| CN | 114942722 A | 8/2022 |

(Continued)

OTHER PUBLICATIONS

B. Sinharoy et al. "IBM POWER8 processor core microarchitecture," IBM J. Res. & Dev. vol. 59 No. 1 Paper 2 Jan./Feb. 2015, 21 pages.

(Continued)

*Primary Examiner* — Chun Kuan Lee
(74) *Attorney, Agent, or Firm* — Nicholson De Vos Webster & Elliott LLP

(57) ABSTRACT

Techniques relating to virtual idle loops are described. In an embodiment, decoder circuitry decodes a single instruction. The single instruction includes a field for an identifier of a first source operand, a field for an identifier of a second source operand, a field for an identifier of a destination operand, and a field for an opcode. Execution circuitry executes the decoded instruction according to the opcode to: write the first source operand to a memory location identified by the second source operand; compute an index into a control array based at least in part on the destination operand; and determine whether to exit to a hypervisor of a Virtual Machine (VM) based at least in part on data stored at a location in the control array, wherein the location is to be identified by the computed index. Other embodiments are also disclosed and claimed.

25 Claims, 11 Drawing Sheets

(56)      References Cited

U.S. PATENT DOCUMENTS

| | | | |
|---|---|---|---|
| 6,560,693 B1 | 5/2003 | Puzak et al. | |
| 6,625,694 B2 | 9/2003 | Masri et al. | |
| 6,678,847 B1 | 1/2004 | Perry et al. | |
| 6,684,298 B1 | 1/2004 | Dwarkadas et al. | |
| 6,687,789 B1 | 2/2004 | Keller et al. | |
| 6,766,442 B1 | 7/2004 | Kahle et al. | |
| 6,779,036 B1 | 8/2004 | Deshpande | |
| 6,826,651 B2 | 11/2004 | Michael et al. | |
| 7,017,011 B2 | 3/2006 | Lesmanne et al. | |
| 7,096,323 B1 | 8/2006 | Conway et al. | |
| 7,844,053 B2 | 11/2010 | Crispin et al. | |
| 8,041,898 B2 | 10/2011 | Moga et al. | |
| 8,392,665 B2 | 3/2013 | Moga et al. | |
| 8,539,212 B1 | 9/2013 | Kang et al. | |
| 9,160,034 B2 | 10/2015 | Kato et al. | |
| 9,164,900 B1 | 10/2015 | Schuttenberg | |
| 9,172,701 B2 | 10/2015 | Burch et al. | |
| 9,519,773 B2 | 12/2016 | Patel et al. | |
| 9,940,138 B2 | 4/2018 | Lopez et al. | |
| 10,008,735 B2 | 6/2018 | Ohtomo et al. | |
| 11,085,964 B2 | 8/2021 | Kurts et al. | |
| 11,216,366 B2 | 1/2022 | Durham et al. | |
| 2002/0078331 A1 | 6/2002 | Ju et al. | |
| 2002/0103979 A1 | 8/2002 | Koga | |
| 2002/0116662 A1 | 8/2002 | Hofstee et al. | |
| 2003/0023836 A1 | 1/2003 | Catherwood et al. | |
| 2003/0041212 A1 | 2/2003 | Creta et al. | |
| 2003/0149865 A1 | 8/2003 | Kadambi | |
| 2003/0163649 A1 | 8/2003 | Kapur et al. | |
| 2004/0078558 A1 | 4/2004 | Sprangle | |
| 2004/0151986 A1 | 8/2004 | Park et al. | |
| 2005/0125640 A1 | 6/2005 | Ford et al. | |
| 2005/0198187 A1 | 9/2005 | Tierney et al. | |
| 2005/0198479 A1 | 9/2005 | Bean et al. | |
| 2006/0101209 A1 | 5/2006 | Lais et al. | |
| 2006/0143408 A1 | 6/2006 | Sistla | |
| 2006/0206686 A1 | 9/2006 | Banerjee et al. | |
| 2006/0294344 A1 | 12/2006 | Hsu et al. | |
| 2007/0055826 A1 | 3/2007 | Morton et al. | |
| 2007/0055958 A1 | 3/2007 | Birenheide et al. | |
| 2007/0233932 A1 | 10/2007 | Collier et al. | |
| 2008/0059710 A1 | 3/2008 | Handgen et al. | |
| 2008/0162868 A1 | 7/2008 | Glew | |
| 2009/0015589 A1 | 1/2009 | Luick et al. | |
| 2009/0248989 A1 | 10/2009 | Chicheportiche et al. | |
| 2009/0276581 A1 | 11/2009 | Moga et al. | |
| 2010/0275049 A1 | 10/2010 | Balakrishnan et al. | |
| 2010/0332762 A1 | 12/2010 | Moga et al. | |
| 2011/0045355 A1 | 2/2011 | Ichikawa | |
| 2011/0055523 A1 | 3/2011 | Kaplan et al. | |
| 2011/0283124 A1 | 11/2011 | Branover et al. | |
| 2012/0079214 A1 | 3/2012 | Moga et al. | |
| 2012/0131555 A1 | 5/2012 | Hossain et al. | |
| 2012/0159073 A1 | 6/2012 | Jaleel et al. | |
| 2012/0159074 A1 | 6/2012 | Sodhi et al. | |
| 2012/0301796 A1 | 11/2012 | Ohtomo et al. | |
| 2012/0308900 A1 | 12/2012 | Ogasa | |
| 2013/0246709 A1 | 9/2013 | Segelken et al. | |
| 2013/0275724 A1 | 10/2013 | Bharadwaj | |
| 2013/0295464 A1 | 11/2013 | Yanagi et al. | |
| 2014/0143771 A1* | 5/2014 | Tsirkin | G06F 9/45558 718/1 |
| 2014/0195790 A1 | 7/2014 | Merten et al. | |
| 2014/0297919 A1 | 10/2014 | Nachimuthu et al. | |
| 2015/0127983 A1 | 5/2015 | Trobough et al. | |
| 2015/0147659 A1 | 5/2015 | Kato | |
| 2015/0254186 A1 | 9/2015 | Sugimoto et al. | |
| 2016/0011975 A1 | 1/2016 | Ananthakrishnan et al. | |
| 2016/0092673 A1* | 3/2016 | LeMay | G06F 9/45558 718/1 |
| 2016/0103232 A1 | 4/2016 | Ouspenski et al. | |
| 2016/0149259 A1 | 5/2016 | Osada et al. | |
| 2016/0156064 A1 | 6/2016 | Miyashita et al. | |
| 2016/0204467 A1 | 7/2016 | Nogami et al. | |
| 2016/0248119 A1 | 8/2016 | Kato | |
| 2016/0268630 A1 | 9/2016 | Tsukada et al. | |
| 2016/0308210 A1 | 10/2016 | Sakuda et al. | |
| 2016/0359193 A1 | 12/2016 | Yi et al. | |
| 2017/0024205 A1 | 1/2017 | Kountanis et al. | |
| 2017/0040637 A1 | 2/2017 | Ceder et al. | |
| 2017/0093567 A1 | 3/2017 | Gopal et al. | |
| 2017/0179481 A1 | 6/2017 | Yamada et al. | |
| 2017/0187066 A1 | 6/2017 | Tsujimura et al. | |
| 2017/0222257 A1 | 8/2017 | Miyashita et al. | |
| 2017/0229734 A1 | 8/2017 | Furukawa et al. | |
| 2017/0243203 A1 | 8/2017 | Bond et al. | |
| 2017/0286254 A1 | 10/2017 | Menon et al. | |
| 2017/0288281 A1 | 10/2017 | Chiang et al. | |
| 2017/0300418 A1 | 10/2017 | Reed et al. | |
| 2018/0060103 A1* | 3/2018 | Tsirkin | G06F 9/45545 |
| 2018/0095752 A1 | 4/2018 | Kudaravalli et al. | |
| 2018/0183065 A1 | 6/2018 | Sasaki | |
| 2018/0269521 A1 | 9/2018 | Ohtomo et al. | |
| 2018/0300238 A1 | 10/2018 | Vembu et al. | |
| 2018/0307438 A1 | 10/2018 | Huang et al. | |
| 2019/0012267 A1 | 1/2019 | Scalabrino et al. | |
| 2019/0042799 A1 | 2/2019 | Durham et al. | |
| 2019/0067736 A1 | 2/2019 | Yoshioka et al. | |
| 2019/0088995 A1 | 3/2019 | Asano et al. | |
| 2019/0095345 A1 | 3/2019 | Zmudzinski et al. | |
| 2019/0095389 A1 | 3/2019 | Barnes et al. | |
| 2019/0097266 A1 | 3/2019 | Yamamoto et al. | |
| 2019/0097818 A1 | 3/2019 | Lu et al. | |
| 2019/0220284 A1 | 7/2019 | Gupta et al. | |
| 2019/0347213 A1 | 11/2019 | Lutz et al. | |
| 2020/0089504 A1 | 3/2020 | Sheikh et al. | |
| 2020/0125501 A1 | 4/2020 | Durham et al. | |
| 2020/0125770 A1 | 4/2020 | LeMay et al. | |
| 2020/0134417 A1 | 4/2020 | Mohapatra et al. | |
| 2020/0159676 A1 | 5/2020 | Durham et al. | |
| 2020/0169383 A1 | 5/2020 | Durham et al. | |
| 2020/0210183 A1 | 7/2020 | Burylov et al. | |
| 2020/0212481 A1 | 7/2020 | Nagamine et al. | |
| 2020/0228137 A1 | 7/2020 | Chinya et al. | |
| 2020/0328454 A1 | 10/2020 | Sakai et al. | |
| 2020/0328455 A1 | 10/2020 | Sakai et al. | |
| 2020/0328457 A1 | 10/2020 | Sakai et al. | |
| 2020/0328460 A1 | 10/2020 | Asano et al. | |
| 2020/0328461 A1 | 10/2020 | Asano et al. | |
| 2020/0328462 A1 | 10/2020 | Asano et al. | |
| 2020/0328464 A1 | 10/2020 | Asano et al. | |
| 2020/0328465 A1 | 10/2020 | Sakaida et al. | |
| 2020/0328468 A1 | 10/2020 | Sakaida et al. | |
| 2020/0328469 A1 | 10/2020 | Asano et al. | |
| 2020/0335817 A1 | 10/2020 | Asano et al. | |
| 2020/0348361 A1 | 11/2020 | Kurts et al. | |
| 2020/0350615 A1 | 11/2020 | Sakaida et al. | |
| 2020/0350622 A1 | 11/2020 | Sakaida et al. | |
| 2020/0371811 A1 | 11/2020 | Govindan et al. | |
| 2020/0379902 A1 | 12/2020 | Durham et al. | |
| 2020/0393557 A1 | 12/2020 | Manneschi | |
| 2020/0410327 A1 | 12/2020 | Chinya et al. | |
| 2021/0004233 A1 | 1/2021 | Kumar et al. | |
| 2021/0042617 A1 | 2/2021 | Chinya et al. | |
| 2021/0096861 A1 | 4/2021 | Wang et al. | |
| 2021/0117197 A1 | 4/2021 | Hsu et al. | |
| 2021/0200546 A1 | 7/2021 | LeMay et al. | |
| 2021/0326139 A1 | 10/2021 | Gupta et al. | |
| 2021/0357222 A1 | 11/2021 | Nair et al. | |
| 2021/0364571 A1 | 11/2021 | Kurts et al. | |
| 2021/0397454 A1 | 12/2021 | Plotnikov et al. | |
| 2022/0058023 A1 | 2/2022 | LeMay et al. | |
| 2022/0091852 A1 | 3/2022 | Gupta et al. | |
| 2022/0100520 A1 | 3/2022 | Pokam et al. | |
| 2022/0261509 A1 | 8/2022 | LeMay et al. | |
| 2022/0343029 A1 | 10/2022 | Sultana et al. | |
| 2023/0056699 A1 | 2/2023 | Subramaniam et al. | |
| 2023/0091205 A1 | 3/2023 | Moga et al. | |
| 2023/0195388 A1 | 6/2023 | Butera et al. | |

(56) References Cited

U.S. PATENT DOCUMENTS

| | | | |
|---|---|---|---|
| 2023/0214325 A1 | 7/2023 | Shukla et al. | |
| 2023/0315473 A1 | 10/2023 | Azeem et al. | |

FOREIGN PATENT DOCUMENTS

| | | |
|---|---|---|
| CN | 115904504 A | 4/2023 |
| CN | 116266122 A | 6/2023 |
| CN | 116400960 A | 7/2023 |
| EP | 0354774 A2 | 2/1990 |
| EP | 0354774 A3 | 8/1992 |
| EP | 2508985 A1 | 10/2012 |
| EP | 4044027 A2 | 8/2022 |
| EP | 4141654 A1 | 3/2023 |
| EP | 4198717 A1 | 6/2023 |
| EP | 4209915 A1 | 7/2023 |
| EP | 4392868 A1 | 7/2024 |
| GB | 2599006 A | 3/2022 |
| TW | 202328926 A | 7/2023 |
| WO | 2012040731 A2 | 3/2012 |
| WO | 2012040731 A3 | 3/2012 |
| WO | 2021162792 A1 | 8/2021 |
| WO | 2022139850 A1 | 6/2022 |

OTHER PUBLICATIONS

C.-L. K. Shum et al., "Design and microarchitecture of the IBM System z10 microprocessor," IBM J. Res. & Dev. vol. 53 No. 1 Paper 1 2009, 12 pages.

Chen et al, "Using Dataflow to Optimize Energy Efficiency of Deep Neural Network Accelerators," IEEE Micro, IEEE Computer Society, May/Jun. 2017, 10 pages.

Chen et al. "Eyeriss: An Energy-Efficient Reconfigurable Accelerator for Deep Convolutional Neural Networks," in ISSCC 2016, IEEE International Solid-State Circuits Conference, Jan. 31-Feb. 4, 2016, 4 pages.

Chromium Blog: Efficient and Safe Allocations Everywhere!, downloaded from "https://blog.chromium.org/2021/04/efficient-and-safe-allocations-everyw," on Jun. 22, 2021, 6 pages.

Farooq, M. Umar, and Lizy K. John. "Store-load-branch (slb) predictor: A compiler assisted branch prediction for data dependent branches." High Performance Computer Architecture (HPCA2013), 2013 IEEE 19th International Symposium on. IEEE, 2013.

Gao, et al. "Address-branch correlation: A novel locality for long latency hard-to-predict branches," High Performance Computer Architecture, HPCA 2008, IEEE 14th International Symposium, Piscataway, New Jersey (Feb. 16, 2008).

HPC Cluster Tuning on 3rd Generation Intel Xeon Scalable Processors, Intel Optimization Guide, High Performance Computing Intel Xeon Scalable Processor, 10 pages.

IBM T. J. Watson Research Center, "IBM T. J. Watson Research Center," downloaded from https://ieeexplore.ieee.org/xpl/tocresult.jsp?isnumber=7175088 on Aug. 24, 2020, 6 pages.

Intel Select Solutions for HPC & AI Converged Clusters [Magpie*], Solution Brief, Intel Select Solutions High Solutions High Performance Computing and AI, May 2019.

Non-final Office Action for U.S. Appl. No. 17/357,963, mailed Apr. 9, 2024, 16 pages.

Luiz Barroso et al., "Attack of the Killer Microseconds," downloaded on Sep. 21, 2022, from [https://cacm.acm.org/magazines/2017/4/215032-attack-of-the-killer-microseconds/fulltext], 8 pages.

Valea et al., "Encryption-Based Secure JTAG," 2019, Montpelier, France, Univ. Grenoble, 6 pages.

European Examination Report for application No. 22208089.7, issued Jan. 18, 2024, 4 pages.

Final Office Action for U.S. Appl. No. 16/905,914, mailed Feb. 27, 2024, 16 pages.

Notice of Allowance issued in U.S. Appl. No. 17/028,387, issued Mar. 27, 2024, 10 pages.

Resubmission: Spec CPU2006 Platform Settings for Lenovo Systems, downloaded from https://www.spec.org/cpu2006/flags/Lenovo-Platform-Flags-V1.2-SKL- . . . , on Sep. 7, 2021, 3 pages.

Das et al., "Secure JTAG Implementation Using Schnorr Protocol," Journal of Electronic Testing, vol. 29, No. 2, 2013, 22 pages.

Dixit et al., "silent data corruptions at scale," arXiv:2102.11245v1, Feb. 22, 2021, 8 pages.

Rosenfeld et al., "Attacks and Defenses for JTAG," Politechnic Institute of New York University, Jan./Feb. 2010, 12 pages.

U.S. Appl. No. 17/953,486, filed Sep. 27, 2022, Andreas Kleen.

Alves et al., "Early Address Prediction: Efficient Pipeline Prefetch and Reuse," ACM Transactions on Architecture and Code Optimization, vol. 18, No. 3, Jun. 8, 2021, 22 pages.

European Search Report for application No. EP 22206883, Jun. 12, 2023, 11 pages.

European Search Report for European Patent Application No. 22 183 309.8, issued Dec. 23, 2022, 11 pages.

U.S. Appl. No. 17/958,071, filed Sep. 30, 2022, Tsvika Kurts.

Cheuk Wong, "Analysis of DPA and DEMA Attacks," San Jose State University, Master's Projects, May 2012, 110 pages.

Hochschild et al., "Cores that don't count," In Proceedings of the Workshop on Hot Topics in Operating Systems (pp. 9-16), 8 pages total, Jun. 2021.

Extended European Search Report for application No. 22208089.7, issued Apr. 28, 2023, 7 pages.

GB Examination Report and Notification of Intention to Grant counterpart GB application GB21111963.1, Jun. 28, 2022, 2 pages.

International Search Report for PCT/US2011/053317, published Mar. 29, 2012, 4 pages.

Extended European Search Report, issued by the European Patent Office on Oct. 19, 2022, 16 pages.

International Search Report (PCT/US2022/037037), issued Oct. 27, 2022, 4 pages.

Partial European Search Report, issued Jul. 12, 2022, for Application No. 22150649.6, 15 pages.

Shuwen Deng et al., "Leaky Frontends: Micro-Op Cache and Processor Frontend Vulnerabilities," arXiv:2105.12224v1. May 25, 2021, pp. 1-13. [See, e.g., PCT ISR, highlighting pp. 3-4 and figure 1.].

Written Opinion of the International Searching Authority, issued Oct. 28, 2022, 7 pages.

Ioana Burcea et al., "Phantom-BTB: A Virtualized Branch Target Buffer Design," ASPLOS'09, Mar. 7-11, 2009, 11 pages.

James Bonanno et al., "Two Level Bulk Preload Branch Prediction," IEEE 978-1-4673-5587-2/13, 2013, 12 pages.

Jouppi et al. "In-Datacenter Performance Analysis of a Tensor Processing Unit," 2017 ACM/IEEE 44th Annual International Symposium on Computer Architecture (ISCA), Tornonto, ON, 2017, 12 pages.

LeMay, Michael "BackupRefPtr Spatial Safety Extension," 8 pages, Feb. 2021.

M. Al-Otoom, E. Forbes, and E. Rotenberg, "Exact: explicit dynamic branch prediction with active updates," in Proceedings of the 7th ACM international conference on Computing frontiers. ACM, 2010, pp. 165-176.

MiraclePtr and *Scan—preventing exploitation of UaF bugs (BlinkOn 13).

Narasimha Adiga et al, "The IBM z15 High Frequency Mainframe Branch Predictor," ACM/IEEE 47the International Symposium on Computer Architecture (ISCA), 2020, 13 pages.

U.S. Appl. No. 17/409,090, filed Aug. 23, 2021, Kameswar Subramaniam.

U.S. Appl. No. 17/555,174, filed Dec. 17, 2021, William Butera.

U.S. Appl. No. 17/957,977, filed Sep. 30, 2022, Sudhanshu Shukla.

Notice of Allowance from application No. 2028988 filed in NL, issued Jul. 29, 2022, 1 page (including Google machine translation). together with allowed claims in English, 3 pages.

Notice of Grant for counterpart GB application No. GB2599006 (issued Sep. 13, 2022, 2 pages.

Notice of Grant from counterpart Dutch patent application under No. under No. 2028988, Jul. 27, 2022, 5 pages [with Google Translation].

Office Action issued on Apr. 4, 2022 for Dutch Patent Application No. 20228988.

(56) References Cited

OTHER PUBLICATIONS

Rakesh Kumar et al. "Blasting Through the Front-End Bottleneck With Shotgun," ASPLOS'18, Mar. 24-28, 2018, 13 pages.

Sheikh, Rami, James Tuck, and Eric Rotenberg. "Control-flow decoupling." Proceedings of the 2012 45th Annual IEEE/ACM International Symposium on Microarchitecture. IEEE Computer Society, 2012.

Sheikh, Rami, James Tuck, and Eric Rotenberg. "Control-Flow Decoupling: An Approach for Timely, Non-speculative Branching," IEEE Transactions on Computers, Oct. 2014.

Spec CPU2006 Platform Settings for Lenovo Systems, downloaded from https://www.spec.org/cpu2006/flags/Lenovo-Platform-Flags-V1.2-SKL- . . . , on Sep. 7, 2021, 3 pages.

Sudhanshu Shukla et al., "Register File Prefetching," International Symposium on Computer Architecture (ISCA '22). ACM, New York, NY, USA, Jun. 18-22, 2022, published Jun. 11, 2022, 14 pages.

Ziad, Mohamed Tarek Ibn, "No-FAT: Architectural Support for Low Overhead Memory Safety Checks," Department of Computer Science, New York, NY, pp. 1-14.

* cited by examiner

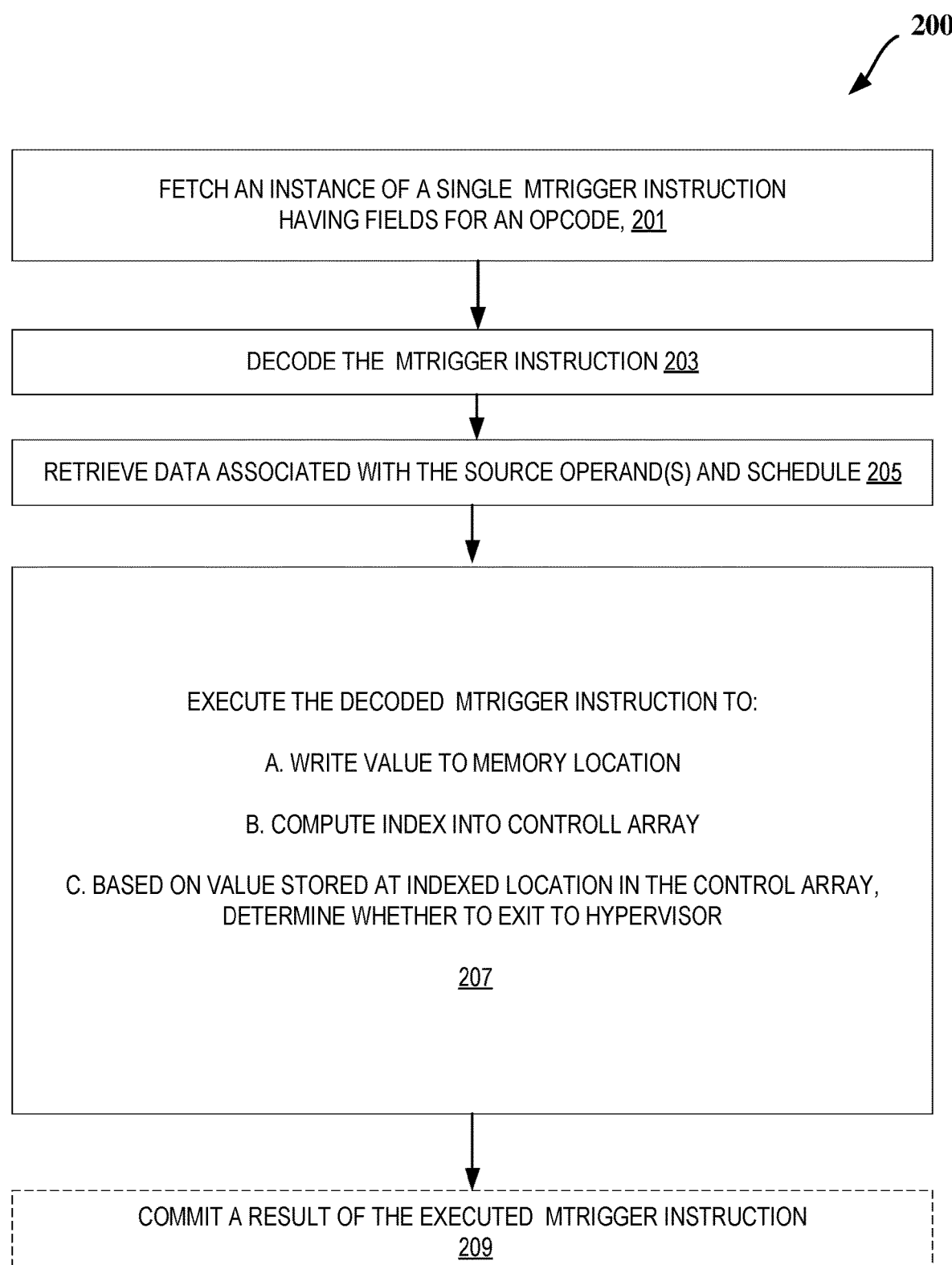

FETCH AN INSTANCE OF A SINGLE MTRIGGER INSTRUCTION HAVING FIELDS FOR AN OPCODE, 201

DECODE THE MTRIGGER INSTRUCTION 203

RETRIEVE DATA ASSOCIATED WITH THE SOURCE OPERAND(S) AND SCHEDULE 205

EXECUTE THE DECODED MTRIGGER INSTRUCTION TO:

A. WRITE VALUE TO MEMORY LOCATION

B. COMPUTE INDEX INTO CONTROLL ARRAY

C. BASED ON VALUE STORED AT INDEXED LOCATION IN THE CONTROL ARRAY, DETERMINE WHETHER TO EXIT TO HYPERVISOR

207

COMMIT A RESULT OF THE EXECUTED MTRIGGER INSTRUCTION
209

FIG. 2

PIPELINE 700

| FETCH 702 | LENGTH DECODING 704 | DECODE 706 | ALLOC. 708 | RENAMING 710 | SCHEDULE 712 | REGISTER READ/ MEMORY READ 714 | EXECUTE STAGE 716 | WRITE BACK/ MEMORY WRITE 718 | EXCEPTION HANDLING 722 | COMMIT 724 |

| PREFIX(ES) 901 | OPCODE 903 | ADDRESSING INFORMATION 905 | DISPLACEMENT VALUE 907 | IMMEDIATE VALUE 909 |

FIG. 9

VIRTUAL IDLE LOOPS

FIELD

The present disclosure generally relates to the field of computing. More particularly, some embodiments relate to techniques to implement virtual idle loops.

BACKGROUND

Modern computing workloads often have short idle periods, for example, to wait for a reply from a network or a storage disk. In a virtualized environment example, a hypervisor (monitoring a Virtual Machine (VM)) may intercept a Halt (HLT) idle instruction to put the VM to sleep and allow other VMs to run to increase the utilization of a server. This can result in a round trip through the hypervisor and host idle loop or host scheduler.

This may, however, take longer than an expected timeout for a target short idle period. And even if it does not take longer, it may still increase the critical time from a wakeup event occurrence to code execution in a guest VM, which increases latency.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 2 illustrates an example method performed by a processor to process an instruction.

FIG. 9 illustrates examples of an instruction format.

DETAILED DESCRIPTION

Figure 1:
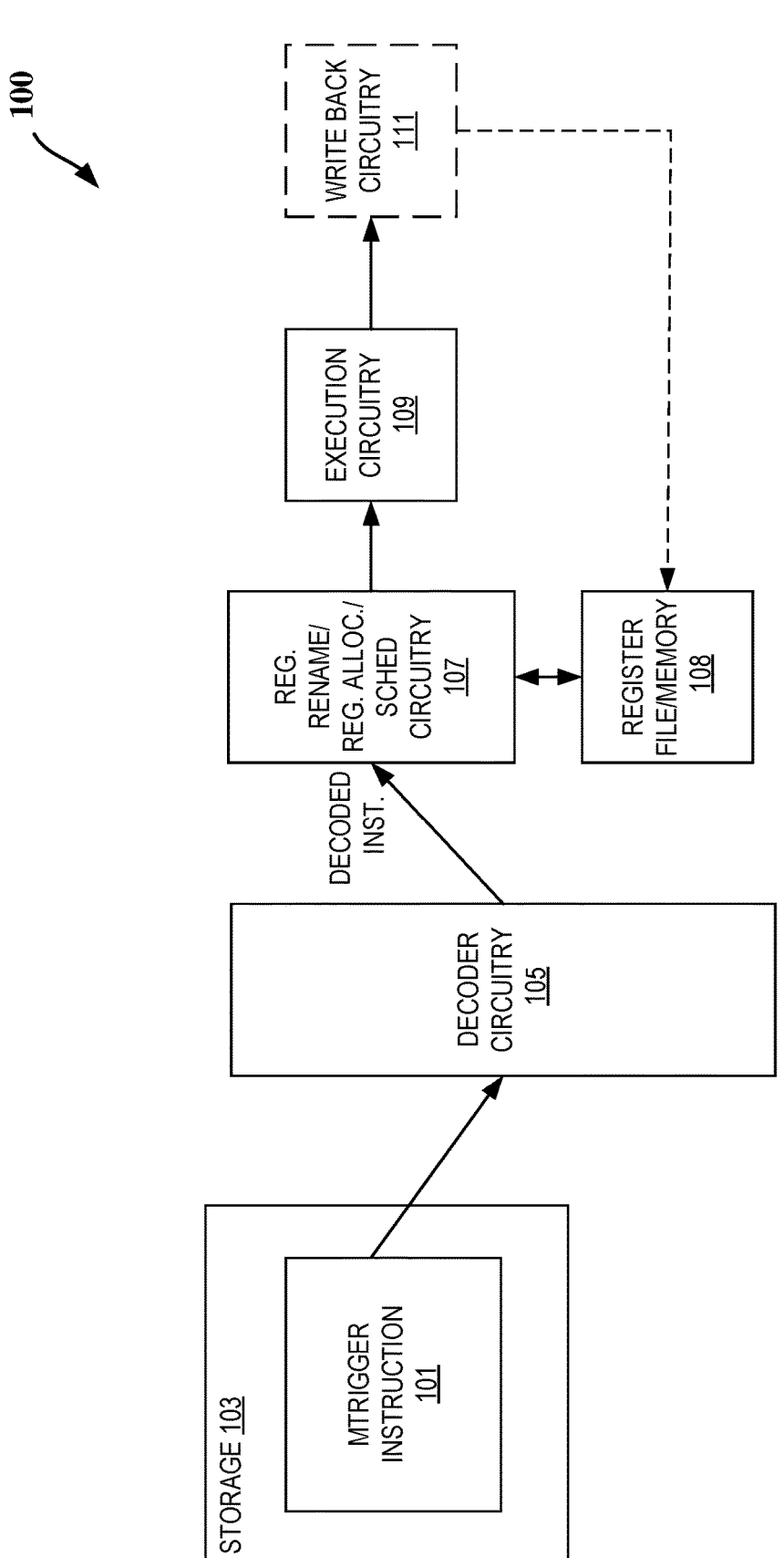
FIG. 1 illustrates examples of computing hardware to process an instruction.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, in a virtualized environment, a hypervisor (monitoring a VM) may intercept an HLT idle instruction to put the VM to sleep, resulting in a round trip through the hypervisor and host idle loop. This may, however, take up a significant portion of a short idle period and in some cases take longer than an expected timeout, and may be avoided by polling for the idle wake up event for some limited time. Such an approach may require special paravirtualization to achieve in some current implementations.

Also, the HLT instruction requires an interrupt if one Central Processing Unit (CPU) or processor in a VM wants to wake up another CPU to execute work. The interrupt typically also needs a round trip through the host. On non-virtualized systems it is possible to use a MONITOR WAIT (MWAIT) instruction which uses special hardware to monitor a memory location for a change, in addition for waiting for any other events that may interrupt the idle loop. Another CPU may wake up the idle CPU by writing to the memory location without the overhead of an interrupt. Today this cannot be efficiently implemented virtually, in part, because it is too expensive (in terms of delay, bandwidth use, and/or resource utilization) and may also be difficult to track the memory write operation from the hypervisor while a target CPU is sleeping. Instead of this tracking, virtualized guest VMs may use the older HLT instruction to put themselves to sleep.

To this end, some embodiments provide techniques to implement virtual idle loops. In an embodiment, a new Monitor Trigger (MTRIGGER) instruction is provided which allows for integration of idle polling into the virtualization architecture, e.g., making it available to all guest VMs. In one embodiment, the MTRIGGER instruction allows for virtualization of wakeup events. Hence, one or more embodiments may reduce the latency for a wakeup operation and/or reduce the overhead associated with entering or exiting an idle loop. At least one embodiment improves the performance of virtual idle loops.

Moreover, the MONITOR or MWAIT instructions cannot be easily virtualized because a sleeping guest VM cannot efficiently intercept a trigger write operation and these instruction are usually disabled in guest VMs. The changes proposed herein in accordance with one or more embodiments allow full virtualization for such tasks, which in turn enables faster wakeup of other processor cores executing guest VMs.

As discussed herein, an "MWAIT" instruction refers to an x86 instruction that provides a hint to allow a processor to stop instruction execution and enter an implementation-dependent optimized state (e.g., a sleep or low power consumption state) until the occurrence of an event. An MWAIT may be considered as a no operation (NOP) instruction architecturally. Also, "paravirtualization" generally refers to an enhancement of virtualization technology in which a guest Operating System (OS) is modified prior to installation inside a VM in order to allow all guest OSes within the system to share resources and successfully collaborate, rather than attempt to emulate an entire hardware environment. Further, an "MONITOR" instruction generally refers to an x86 instruction that sets up a linear address range to be monitored by monitoring hardware. While some embodiments are discussed with reference to an x86 Instruction Set Architecture (ISA), embodiments are not limited to an x86 ISA and other ISAs may be utilized to implement the operations discussed herein with reference to various instructions.

By contrast, some software may add a paravirtualized idle loop which would perform limited polling. Also, hypervisors generally would disable the use of MONITOR/MWAIT in guest VMs, forcing the guest VM to fall back to Inter Processor Interrupts (IPIs) for wake processor cores. Moreover, a paravirtualized idle loop requires hypervisor-aware clients. However, paravirtualized idle loops cannot be fully controlled by a hypervisor and require guest VM cooperation. And, the Monitor/MWAIT instructions are not used in guest VMs, limiting low latency wake-up from other processors, requiring a full IPI to wake up another processor core executing a guest VM. Additionally, polling in software is less energy efficient than using the snooping feature of MONITOR/MWAIT instructions.

As a result, one or more embodiments may remove a need to use hypervisor-aware guest VMs to obtain low-latency short guest VM idle periods (e.g., less than 1 milli second (ms), tens or hundreds of micro second, etc.). Rather, a hypervisor may control idle polling in the guest VM and use energy efficient wakeup operations. This may result in faster wakeup of a processor core executing a guest VM through MONITOR/MWAIT instead of requiring Inter Processor Interrupts.

FIG. 1 illustrates examples of computing hardware to process an MTRIGGER instruction. As illustrated, storage 103 stores the MTRIGGER instruction 101 to be executed.

The instruction 101 is received by decoder circuitry 105. For example, the decoder circuitry 105 receives this instruction from fetch circuitry (not shown). The instruction may be in any suitable format, such as that describe with reference to FIG. 9 below. In an example, the instruction includes fields for an opcode, source identifier(s), and a destination identifier. In some examples, the sources and destination are registers, and in other examples one or more are memory locations. In some examples, one or more of the sources may be an immediate operand. In some examples, the opcode details to be performed.

More detailed examples of at least one instruction format for the instruction will be detailed later. The decoder circuitry 105 decodes the instruction into one or more operations. In some examples, this decoding includes generating a plurality of micro-operations to be performed by execution circuitry (such as execution circuitry 109). The decoder circuitry 105 also decodes instruction prefixes.

In some examples, register renaming, register allocation, and/or scheduling circuitry 107 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 108 store data as operands of the instruction to be operated by execution circuitry 109. Example register types include packed data registers, general purpose registers (GPRs), and floating-point registers.

Execution circuitry 109 executes the decoded instruction. Example detailed execution circuitry includes execution circuitry 109 shown in FIG. 1, and execution cluster(s) 760 shown in FIG. 7(B), etc. The execution of the decoded instruction causes the execution circuitry to perform the associated operations.

In some examples, retirement/write back circuitry 111 architecturally commits the destination register into the registers or memory 108 and retires the instruction.

An example of a format for an instruction is OPCODE DST, SRC1, SRC2. In some examples, OPCODE is the opcode mnemonic of the instruction. DST is a field for the destination operand, such as packed data register or memory. SRC1 and SRC2 are fields for the source operands, such as packed data registers and/or memory.

FIG. 2 illustrates an example method performed by a processor to process an instruction. For example, a processor core as shown in FIG. 7(B), a pipeline as detailed below, etc., performs this method.

At 201, an instance of single instruction is fetched. For example, an instruction is fetched. The instruction includes fields for an opcode, and optionally specifics of indications of particular operands and/or immediate operands. In some examples, the instruction further includes a field for a writemask. In some examples, the instruction is fetched from an instruction cache. The opcode indicates the operation(s) to perform.

The fetched instruction is decoded at 203. For example, the fetched instruction is decoded by decoder circuitry such as decoder circuitry 105 or decode circuitry 740 detailed herein.

Data values associated with the source operands of the decoded instruction are retrieved when the decoded instruction is scheduled at 205. For example, when one or more of the source operands are memory operands, the data from the indicated memory location is retrieved.

At 207, the decoded instruction is executed by execution circuitry (hardware) such as execution circuitry 109 shown in FIG. 1, execution circuitry 109 shown in FIG. 1, or execution cluster(s) 760 shown in FIG. 7(B). For the instruction, the execution will cause execution circuitry to perform the operations described in connection with FIG. 1. As shown, in at least one embodiment, execution of the MTRIGGER instruction causes writing of a value to a memory location based on a memory address, computation of an index into a control array (such as the control array 306 of FIG. 3), and a determination of whether to exit/hand off execution to a hypervisor based at least in part on a value stored at the indexed location in the control array. Further details regarding the execution of the MTRIGGER instruction are discussed below with reference to FIG. 4.

In some examples, the instruction is committed or retired at 209.

Figure 3:
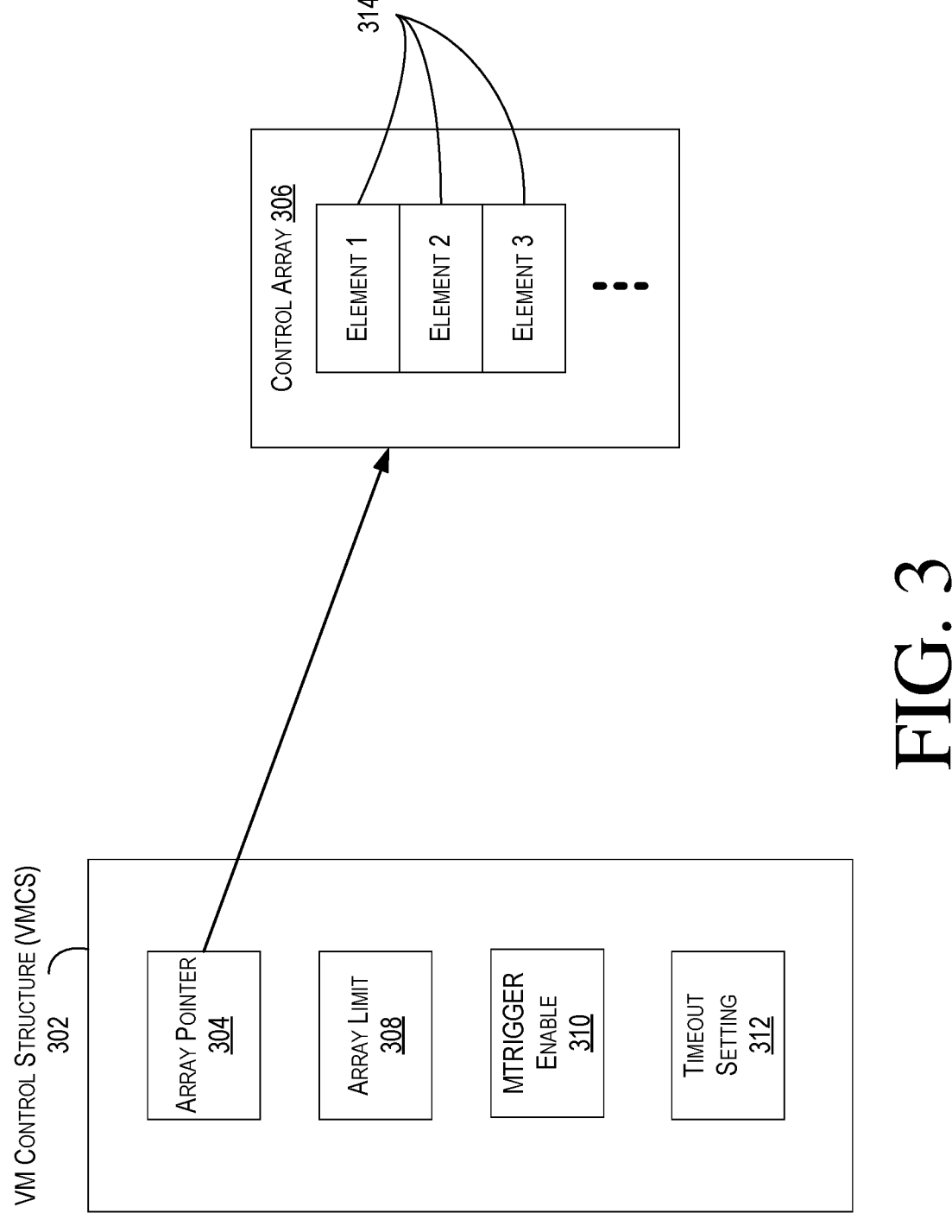
FIG. 3 illustrates a block diagram of a virtual machine control structure, according to an embodiment.

FIG. 3 illustrates a block diagram of a VM Control Structure (VMCS) 302, according to an embodiment. As shown, the VM control structure 302 stores information for: a pointer 304 to a control array 306, an array limit 308, a control bit for enabling/disabling MTRIGGER interception 310, and a timeout configuration setting 312 for a virtualized MWAIT instruction. The control array 306 may store one or more elements 314, where each element 314 in the control array 306 corresponds to a separate VCPU in that guest VM and each element 314 includes 64 bytes of data in an embodiment (e.g., for cacheline padding). The values stored in the elements are then used to determine whether to exit to a hypervisor as further discussed below.

Figure 4:
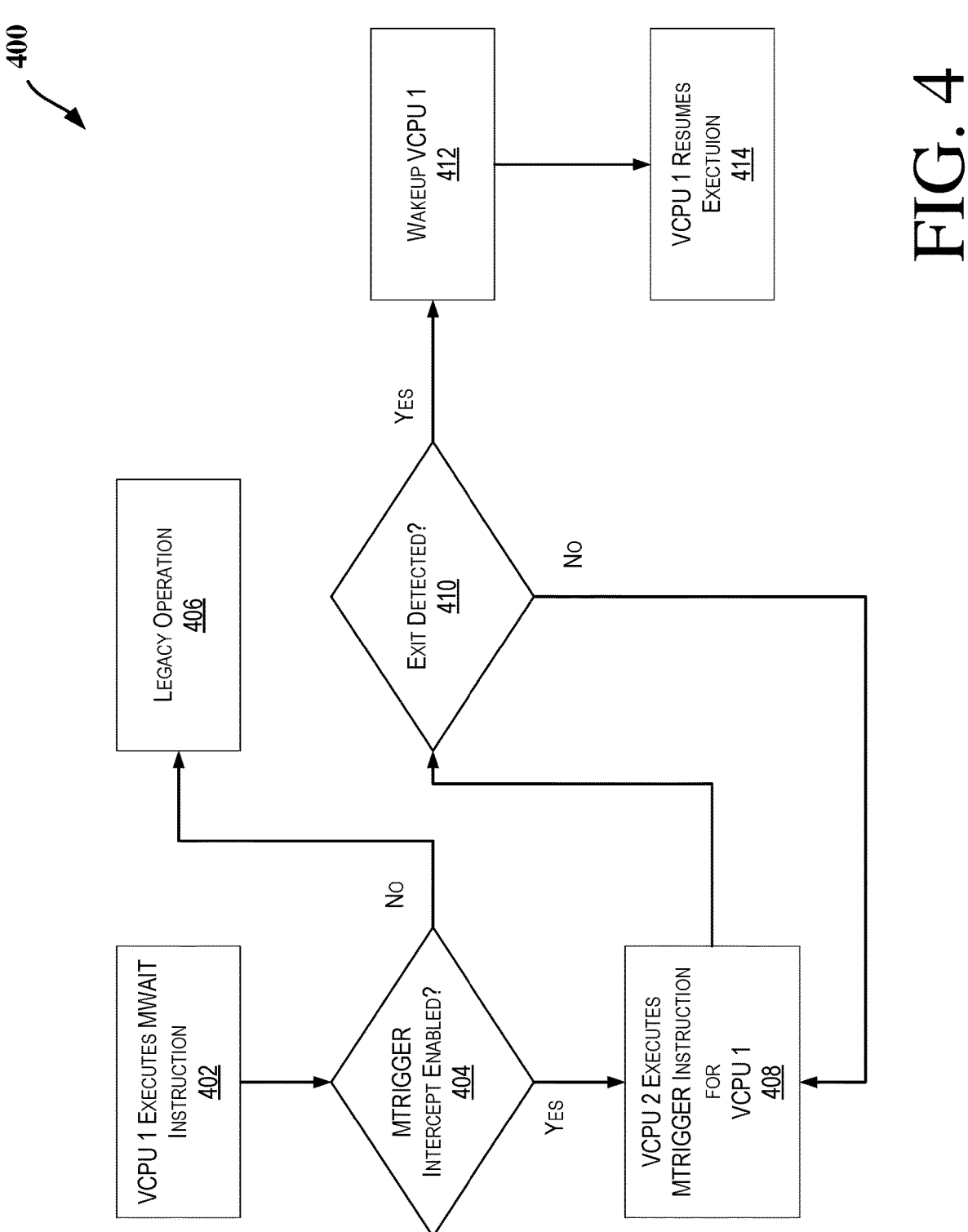
FIG. 4 illustrates a flow diagram of a method to improve the performance of virtual idle loops, according to an embodiment.

FIG. 4 illustrates a flow diagram of a method 400 to improve the performance of virtual idle loops, according to an embodiment. One or more of the operations of method

400 may be performed by one or more components discussed herein with reference to FIGS. 1-3 and 5-10.

In one embodiment, a new MTRIGGER instruction has three arguments: a value (or a first source operand), a memory address (or a second source operand), and an identifier (ID) (such as an Advanced Programmable Interrupt Controller (APIC) ID) of a target processor core (or a identifier of a destination operand). In an embodiment, the MTRIGGER instruction is an augmented move instruction, where the value is the choice of the guest OS and the value is stored at the supplied memory address. The stored value may be used to trigger a wakeup from an MWAIT of the target CPU if it is in guest context. But a guest OS may also check the value in other circumstances, e.g., to determine if it should check its run queue for new work to be processed. Execution of the MTRIGGER instruction causes the value to be written to the memory address and a determination of whether to exit to a hypervisor based at least in part on a value stored in an entry of the control array 306 based on an index to be computed per the ID of the target processor core. Moreover, in a virtualized environment multiple processor cores may be used to execute instructions. These processor cores are sometimes interchangeably referred to herein as Virtual Central Processing Units (VCPUs). Also, in some embodiments, more than one processor core/VCPU may be assigned to execute operations for a given VM.

Referring to FIGS. 1 to 4, at an operation 402, a first VCPU labeled as "VCPU 1" executes an MWAIT instruction. At an operation 404, it is determined whether an intercept for an MTRIGGER instruction is enabled (e.g., by reference to the status of the control bit 310). In one embodiment, execution of the MWAIT instruction at operation 402 enables the intercept for the MTRIGGER instruction for VCPU 1 by updating the control bit 310. If the MTRIGGER intercept is disabled, method 400 continues at operation 406 with legacy operations.

Once the MTRIGGER intercept is determined to be enabled for VCPU 1, at an operation 408, a second VCPU labeled as "VCPU 2" executes the MTRIGGER instruction for VCPU 1 to indicate that it has work available as discussed herein. At an operation 410, once a VM exit is detected (e.g., by the VCPU 2 based on the value stored at the indexed location of the control array 306), the VCPU 1 is woken up (e.g., by a hypervisor) at an operation 412; otherwise, method 400 resumes at operation 408, After the VCPU 1 is woken up at operation 412, VCPU 1 resumes execution at an operation 414.

In one embodiment, once the MTRIGGER interception is determined to be enabled at operation 404 (e.g., per the status of the control bit 310), the MTRIGGER instruction uses the ID of the target processor core/VCPU (e.g., the APIC ID) multiplied by the element size of the control array 306 (e.g., 64) to index into the control array 306 at operation 408. When the value at this indexed location/address is true, an exit to a hypervisor is triggered at operation 410; otherwise, an exit to the hypervisor is not triggered. This allows a hypervisor to efficiently enable/disable interception of the MTRIGGER instruction on another processor core (e.g., VCPU 2) when the initial processor core (e.g., VCPU 1) enters a low power consumption state (e.g., goes to sleep) in response to execution of an MWAIT instruction (e.g., at operation 402) without risking performance degradation from false sharing in cachelines.

While some embodiments are discussed herein with reference to an x86 architecture, embodiments are not limited to this architecture and other cacheline sizes may be used (such as 64 bit, 128 bit, etc.). Also, instead of a padded array it is possible to use some other data structure, for example the VMCS could have a pointer to a memory structure with VCPU specific data and the control flag could be located there. This would also avoid the false sharing problems that the padding is avoiding.

Hence, when a VCPU is not currently scheduled by the host, another VCPU uses the MTRIGGER intercept to wake up the sleeping VCPU. Otherwise a VCPU executing a guest MWAIT may be woken up directly through a memory write by MONITOR/MWAIT snooping (operation 406). In an embodiment, the MWAIT instruction is enhanced to wait for the configured timeout 312 in a low power state if enabled. After the timeout expires, the MWAIT instruction exits to the hypervisor.

In at least one embodiment, a virtualized idle loop that is woken up by an Input/Output ("IO" or "I/O") interrupt may include the following operations:

(1) hypervisor intercepts a halt (HLT) event (e.g., to stop execution);

(2) hypervisor drops the processor core/VCPU by context switching to one of its own idle loops or another task;

(3) once an TO interrupt or another indication that TO finished, such as polling finds a finished TO operation, occurs on a host VM, it wakes up the sleeping guest VM;

(4) hypervisor enters the guest VM and injects the TO interrupt; and (5) guest VM executes its assigned tasks.

Phases (2) to (5) above may take a significant percentage of time than the total TO wait time on fast TO devices, in extreme cases even longer than the fast TO delays in some implementations.

In one embodiment, a virtualized idle loop that is woken up by another VCPU in a guest VM may include the following operations:

(1) guest executes HLT;

(2) hypervisor intercepts HLT;

(3) hypervisor puts the processor core/VCPU to sleep by context switching to idle or to another task;

(4) another VCPU in the guest VM sends an IPI wakeup interrupt through a virtualized APIC;

(5) the virtualized APIC in the hypervisor wakes up the sleeping VCPU; and (6) the original VCPU is entered and continues executing.

In an embodiment, the virtualized idle loop is replaced by the following operations:

(1) hypervisor configures an MWAIT instruction delay value (e.g., stored in the VMCS 302) and configures a pointer (e.g., pointer 304) to a cacheline padded array of wakeup pointers (one for each VCPU);

(2) guest VM executes a MONITOR instruction to arm snooping hardware;

(3) guest VM executes the MWAIT instruction to enter sleep;

When another VCPU tries to wake up that sleeping VCPU:

(4) the other VCPU tries to wake up the original/sleeping VCPU using the MTRIGGER instruction specifying the target VCPU;

(5) MTRIGGER instruction writes to the array entry of the target VCPU in memory;

(6) the original VCPU detects the snoop on the array entry and wakes up, continuing guest VM execution without entering the hypervisor;

When the idle period is interrupted by an IO interrupt:

(7) the IO interrupt interrupts a host CPU, and then the interrupt handler of the host CPU determines the correct VCPU to wake up and wakes up that VCPU;

When no interrupt or wakeup occurs within the configured timeout:

(8) the MWAIT instruction triggers an exit to the hypervisor, and the hypervisor then puts the VCPU to sleep.

Additionally, some embodiments may be applied in computing systems that include one or more processors (e.g., where the one or more processors may include one or more processor cores), such as those discussed with reference to FIG. 1 et seq., including for example a desktop computer, a workstation, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Example Computer Architectures

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 5:
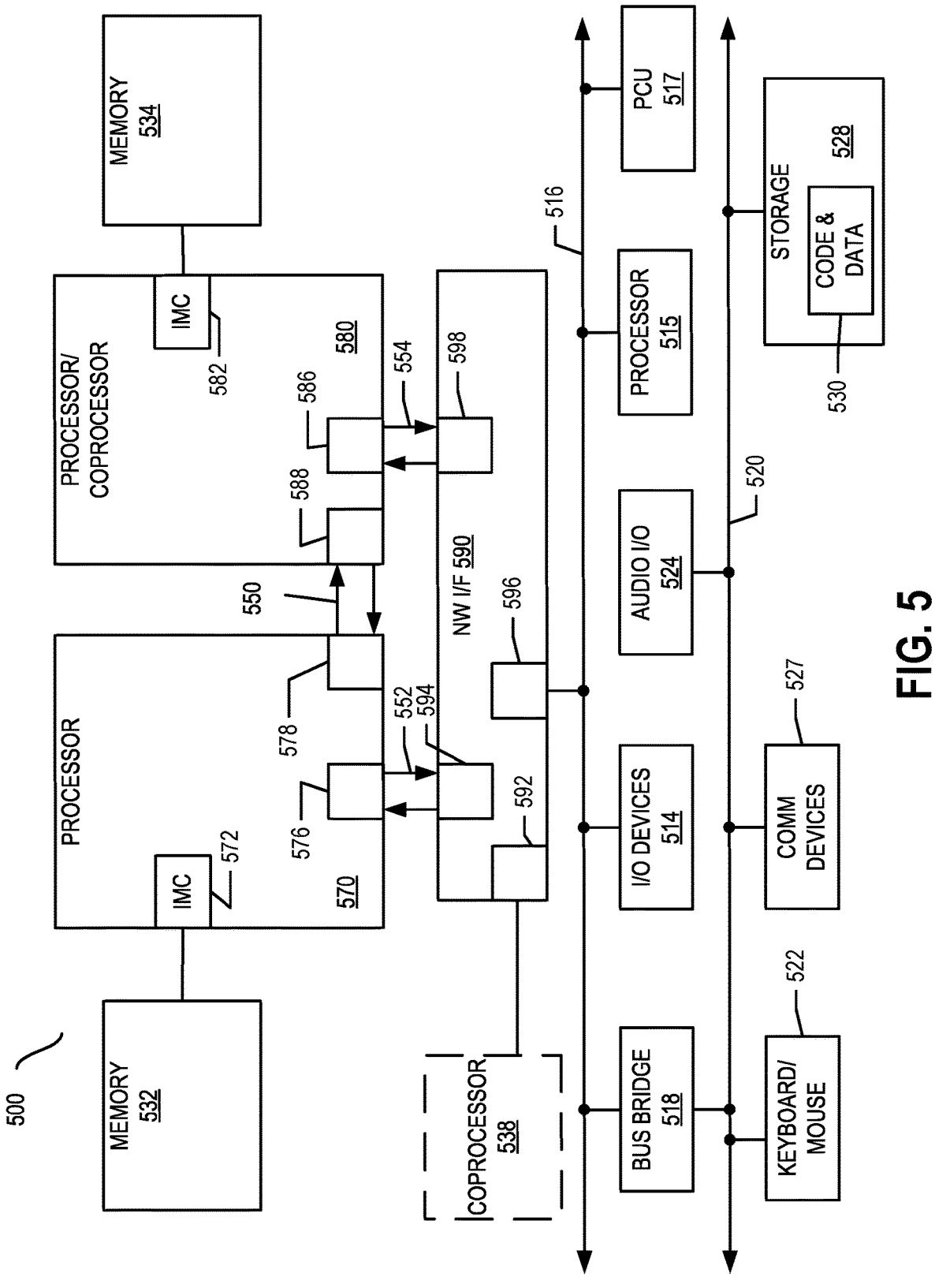
FIG. 5 illustrates an example computing system.

FIG. 5 illustrates an example computing system. Multiprocessor system 500 is an interfaced system and includes a plurality of processors or cores including a first processor 570 and a second processor 580 coupled via an interface 550 such as a point-to-point (P-P) interconnect, a fabric, and/or bus. In some examples, the first processor 570 and the second processor 580 are homogeneous. In some examples, first processor 570 and the second processor 580 are heterogenous. Though the example system 500 is shown to have two processors, the system may have three or more processors, or may be a single processor system. In some examples, the computing system is a system on a chip (SoC).

Processors 570 and 580 are shown including integrated memory controller (IMC) circuitry 572 and 582, respectively. Processor 570 also includes interface circuits 576 and 578; similarly, second processor 580 includes interface circuits 586 and 588. Processors 570, 580 may exchange information via the interface 550 using interface circuits 578, 588. IMCs 572 and 582 couple the processors 570, 580 to respective memories, namely a memory 532 and a memory 534, which may be portions of main memory locally attached to the respective processors.

Processors 570, 580 may each exchange information with a network interface (NW I/F) 590 via individual interfaces 552, 554 using interface circuits 576, 594, 586, 598. The network interface 590 (e.g., one or more of an interconnect, bus, and/or fabric, and in some examples is a chipset) may optionally exchange information with a coprocessor 538 via an interface circuit 592. In some examples, the coprocessor 538 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 570, 580 or outside of both processors, yet connected with the processors via an interface such as P-P interconnect, such that either or both processors' local cache information may be stored in the shared cache if a processor is placed into a low power mode.

Network interface 590 may be coupled to a first interface 516 via interface circuit 596. In some examples, first interface 516 may be an interface such as a Peripheral Component Interconnect (PCI) interconnect, a PCI Express interconnect or another I/O interconnect. In some examples, first interface 516 is coupled to a power control unit (PCU) 517, which may include circuitry, software, and/or firmware to perform power management operations with regard to the processors 570, 580 and/or co-processor 538. PCU 517 provides control information to a voltage regulator (not shown) to cause the voltage regulator to generate the appropriate regulated voltage. PCU 517 also provides control information to control the operating voltage generated. In various examples, PCU 517 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 517 is illustrated as being present as logic separate from the processor 570 and/or processor 580. In other cases, PCU 517 may execute on a given one or more of cores (not shown) of processor 570 or 580. In some cases, PCU 517 may be implemented as a microcontroller (dedicated or general-purpose) or other control logic configured to execute its own dedicated power management code, sometimes referred to as P-code. In yet other examples, power management operations to be performed by PCU 517 may be implemented externally to a processor, such as by way of a separate power management integrated circuit (PMIC) or another component external to the processor. In yet other examples, power management operations to be performed by PCU 517 may be implemented within BIOS or other system software.

Various I/O devices 514 may be coupled to first interface 516, along with a bus bridge 518 which couples first interface 516 to a second interface 520. In some examples, one or more additional processor(s) 515, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 516. In some examples, second interface 520 may be a low pin count (LPC) interface. Various devices may be coupled to second interface 520 including, for example, a keyboard and/or mouse 522, communication devices 527 and storage circuitry 528. Storage circuitry 528 may be one or more non-transitory machine-readable storage media as described below, such as a disk drive or other mass storage device which may include instructions/code and data 530 and may implement the storage 103 in some examples. Further, an audio I/O 524 may be coupled to second interface 520. Note that other architectures than the point-to-point architecture described above are possible. For example, instead of the point-to-point architecture, a system such as multiprocessor system 500 may implement a multidrop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 6:
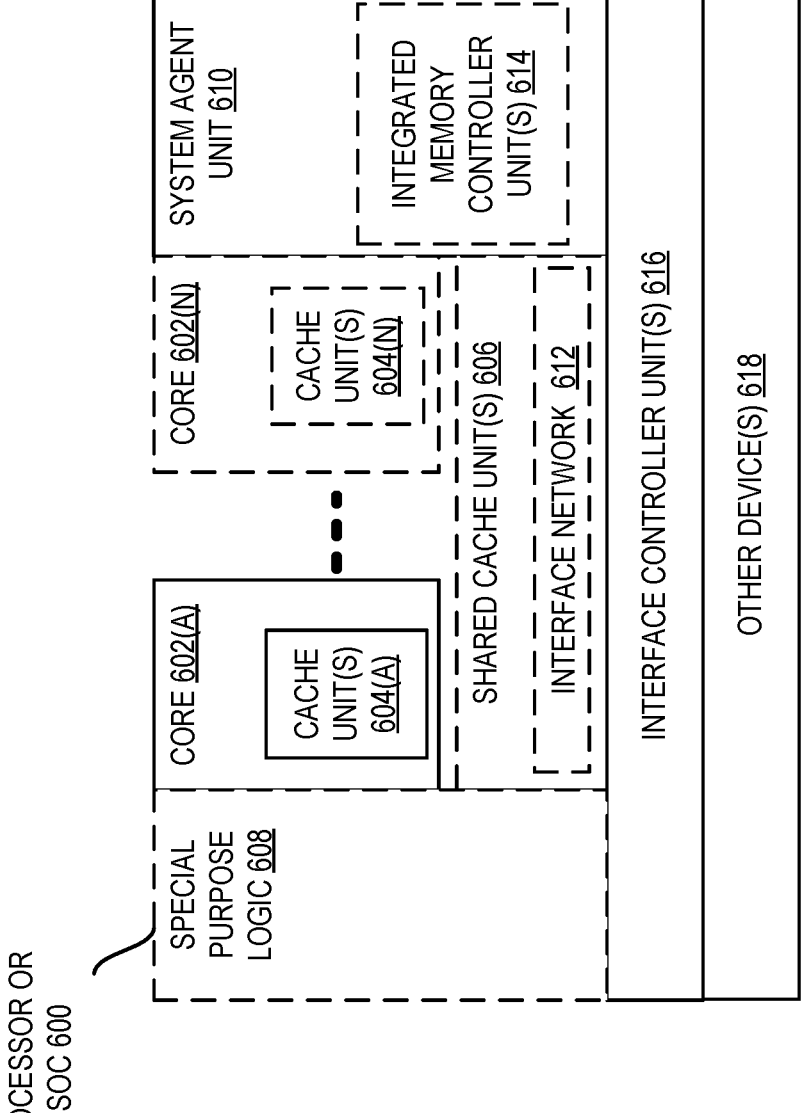
FIG. 6 illustrates a block diagram of an example processor and/or System on a Chip (SoC) that may have one or more cores and an integrated memory controller.

FIG. 6 illustrates a block diagram of an example processor and/or SoC 600 that may have one or more cores and an integrated memory controller. The solid lined boxes illustrate a processor 600 with a single core 602(A), system agent unit circuitry 610, and a set of one or more interface controller unit(s) circuitry 616, while the optional addition of the dashed lined boxes illustrates an alternative processor 600 with multiple cores 602(A)-(N), a set of one or more integrated memory controller unit(s) circuitry 614 in the system agent unit circuitry 610, and special purpose logic 608, as well as a set of one or more interface controller units circuitry 616. Note that the processor 600 may be one of the processors 570 or 580, or co-processor 538 or 515 of FIG. 5.

Thus, different implementations of the processor 600 may include: 1) a CPU with the special purpose logic 608 being integrated graphics and/or scientific (throughput) logic (which may include one or more cores, not shown), and the cores 602(A)-(N) being one or more general purpose cores (e.g., general purpose in-order cores, general purpose out-of-order cores, or a combination of the two); 2) a coprocessor with the cores 602(A)-(N) being a large number of special purpose cores intended primarily for graphics and/or scientific (throughput); and 3) a coprocessor with the cores 602(A)-(N) being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 604(A)-(N) within the cores 602(A)-(N), a set of one or more shared cache unit(s) circuitry 606, and external memory (not shown) coupled to the set of integrated memory controller unit(s) circuitry 614. The set of one or more shared cache unit(s) circuitry 606 may include one or more mid-level caches, such as level 2 (L2), level 3 (L3), level 4 (L4), or other levels of cache, such as a last level cache (LLC), and/or combinations thereof. While in some examples interface network circuitry 612 (e.g., a ring interconnect) interfaces the special purpose logic 608 (e.g., integrated graphics logic), the set of shared cache unit(s) circuitry 606, and the system agent unit circuitry 610, alternative examples use any number of well-known techniques for interfacing such units. In some examples, coherency is maintained between one or more of the shared cache unit(s) circuitry 606 and cores 602(A)-(N). In some examples, interface controller units circuitry 616 couple the cores 602 to one or more other devices 618 such as one or more I/O devices, storage, one or more communication devices (e.g., wireless networking, wired networking, etc.), etc.

In some examples, one or more of the cores 602(A)-(N) are capable of multi-threading. The system agent unit circuitry 610 includes those components coordinating and operating cores 602(A)-(N). The system agent unit circuitry 610 may include, for example, power control unit (PCU) circuitry and/or display unit circuitry (not shown). The PCU may be or may include logic and components needed for regulating the power state of the cores 602(A)-(N) and/or the special purpose logic 608 (e.g., integrated graphics logic). The display unit circuitry is for driving one or more externally connected displays.

The cores 602(A)-(N) may be homogenous in terms of instruction set architecture (ISA). Alternatively, the cores 602(A)-(N) may be heterogeneous in terms of ISA; that is, a subset of the cores 602(A)-(N) may be capable of executing an ISA, while other cores may be capable of executing only a subset of that ISA or another ISA.

Example Core Architectures—In-Order and Out-of-Order Core Block Diagram

Figure 7A:
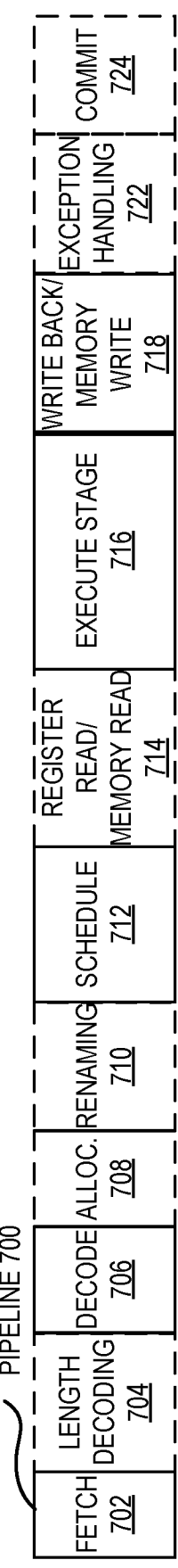
FIG. 7(A) is a block diagram illustrating both an example in-order pipeline and an example register renaming, out-of-order issue/execution pipeline according to examples.
Figure 7B:
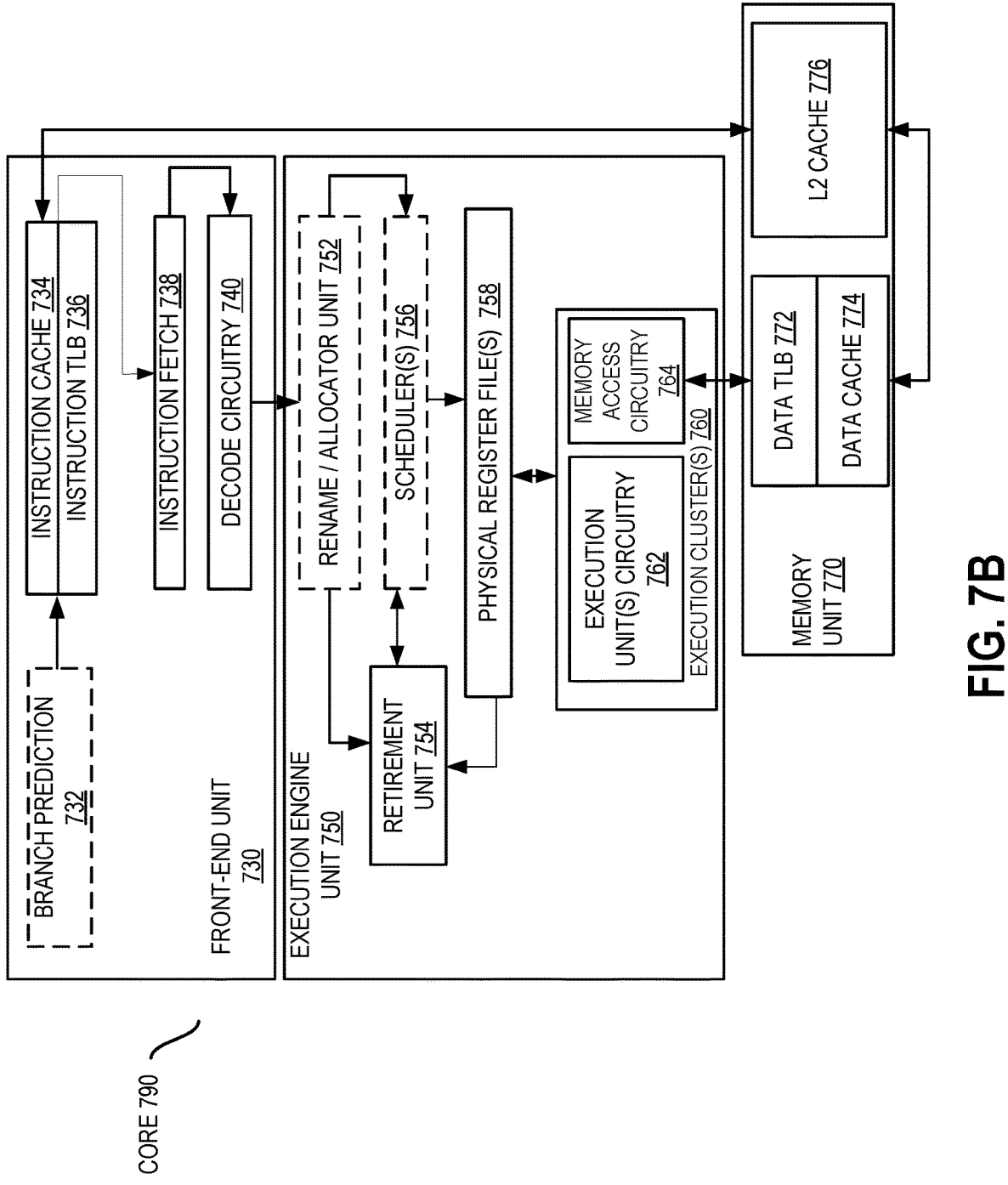
FIG. 7(B) is a block diagram illustrating both an example in-order architecture core and an example register renaming, out-of-order issue/execution architecture core to be included in a processor according to examples.

FIG. 7(A) is a block diagram illustrating both an example in-order pipeline and an example register renaming, out-of-order issue/execution pipeline according to examples. FIG. 7(B) is a block diagram illustrating both an example in-order architecture core and an example register renaming, out-of-order issue/execution architecture core to be included in a processor according to examples. The solid lined boxes in FIGS. 7(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7(A), a processor pipeline 700 includes a fetch stage 702, an optional length decoding stage 704, a decode stage 706, an optional allocation (Alloc) stage 708, an optional renaming stage 710, a schedule (also known as a dispatch or issue) stage 712, an optional register read/memory read stage 714, an execute stage 716, a write back/memory write stage 718, an optional exception handling stage 722, and an optional commit stage 724. One or more operations can be performed in each of these processor pipeline stages. For example, during the fetch stage 702, one or more instructions are fetched from instruction memory, and during the decode stage 706, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 706 and the register read/memory read stage 714 may be combined into one pipeline stage. In one example, during the execute stage 716, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 7(B) may implement the pipeline 700 as follows: 1) the instruction fetch circuitry 738 performs the fetch and length decoding stages 702 and 704; 2) the decode circuitry 740 performs the decode stage 706; 3) the rename/allocator unit circuitry 752 performs the allocation stage 708 and renaming stage 710; 4) the scheduler(s) circuitry 756 performs the schedule stage 712; 5) the physical register file(s) circuitry 758 and the memory unit circuitry 770 perform the register read/memory read stage 714; the execution cluster(s) 760 perform the execute stage 716; 6) the memory unit circuitry 770 and the physical register file(s) circuitry 758 perform the write back/memory write stage 718; 7) various circuitry may be involved in the exception handling stage 722; and 8) the retirement unit circuitry 754 and the physical register file(s) circuitry 758 perform the commit stage 724.

FIG. 7(B) shows a processor core 790 including front-end unit circuitry 730 coupled to execution engine unit circuitry 750, and both are coupled to memory unit circuitry 770. The core 790 may be a reduced instruction set architecture computing (RISC) core, a complex instruction set architecture computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit circuitry 730 may include branch prediction circuitry 732 coupled to instruction cache circuitry 734, which is coupled to an instruction translation lookaside buffer (TLB) 736, which is coupled to instruction fetch circuitry 738, which is coupled to decode circuitry 740. In one example, the instruction cache circuitry 734 is included in the memory unit circuitry 770 rather than the front-end circuitry 730. The decode circuitry 740 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 740 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 740 may be implemented using various different mechanisms. Examples of suitable mechanisms include, but are not limited to, look-up tables, hardware implementations, programmable logic arrays (PLAs), microcode read only memories (ROMs), etc. In one example, the core 790 includes a microcode ROM (not shown) or other medium that stores microcode for certain macroinstructions (e.g., in decode circuitry 740 or otherwise within the front-end circuitry 730). In one example, the decode circuitry 740 includes a micro-operation (micro-op) or operation cache (not shown) to hold/cache decoded operations, micro-tags, or micro-operations generated during the decode or other stages of the processor pipeline 700. The decode circuitry 740 may be coupled to rename/allocator unit circuitry 752 in the execution engine circuitry 750.

The execution engine circuitry 750 includes the rename/allocator unit circuitry 752 coupled to retirement unit circuitry 754 and a set of one or more scheduler(s) circuitry 756. The scheduler(s) circuitry 756 represents any number of different schedulers, including reservations stations, central instruction window, etc. In some examples, the scheduler(s) circuitry 756 can include arithmetic logic unit (ALU) scheduler/scheduling circuitry, ALU queues, address generation unit (AGU) scheduler/scheduling circuitry, AGU queues, etc. The scheduler(s) circuitry 756 is coupled to the physical register file(s) circuitry 758. Each of the physical register file(s) circuitry 758 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 758 includes vector registers unit circuitry, writemask registers unit circuitry, and scalar register unit circuitry. These register units may provide architectural vector registers, vector mask registers, general-purpose registers, etc. The physical register file(s) circuitry 758 is coupled to the retirement unit circuitry 754 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 754 and the physical register file(s) circuitry 758 are coupled to the execution cluster(s) 760. The execution cluster(s) 760 includes a set of one or more execution unit(s) circuitry 762 and a set of one or more memory access circuitry 764. The execution unit(s) circuitry 762 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 756, physical register file(s) circuitry 758, and execution cluster(s) 760 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 764). It should also be understood that where separate pipelines are used, one or more of these pipelines may be out-of-order issue/execution and the rest in-order.

In some examples, the execution engine unit circuitry 750 may perform load store unit (LSU) address/data pipelining to an Advanced Microcontroller Bus (AMB) interface (not shown), and address phase and writeback, data phase load, store, and branches.

The set of memory access circuitry 764 is coupled to the memory unit circuitry 770, which includes data TLB cir- cuitry 772 coupled to data cache circuitry 774 coupled to level 2 (L2) cache circuitry 776. In one example, the memory access circuitry 764 may include load unit circuitry, store address unit circuitry, and store data unit circuitry, each of which is coupled to the data TLB circuitry 772 in the memory unit circuitry 770. The instruction cache circuitry 734 is further coupled to the level 2 (L2) cache circuitry 776 in the memory unit circuitry 770. In one example, the instruction cache 734 and the data cache 774 are combined into a single instruction and data cache (not shown) in L2 cache circuitry 776, level 3 (L3) cache circuitry (not shown), and/or main memory. The L2 cache circuitry 776 is coupled to one or more other levels of cache and eventually to a main memory.

The core 790 may support one or more instructions sets (e.g., the x86 instruction set architecture (optionally with some extensions that have been added with newer versions); the MIPS instruction set architecture; the ARM instruction set architecture (optionally with optional additional exten- sions such as NEON)), including the instruction(s) described herein. In one example, the core 790 includes logic to support a packed data instruction set architecture extension (e.g., AVX1, AVX2), thereby allowing the operations used by many multimedia applications to be performed using packed data.

Example Execution Unit(s) Circuitry

Figure 8:
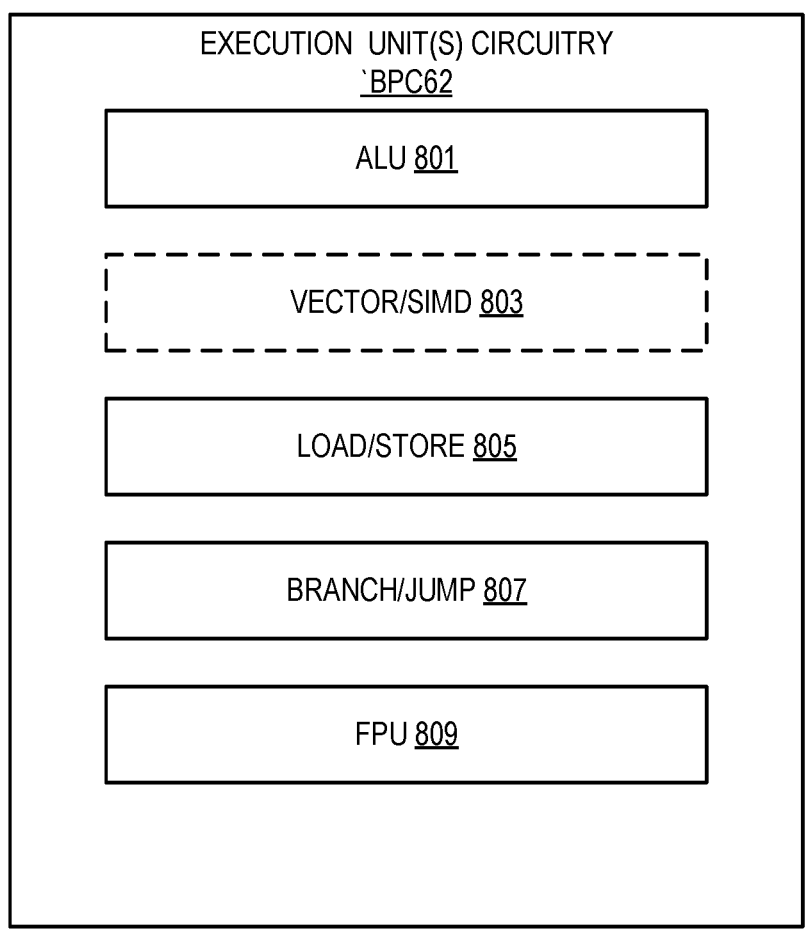
FIG. 8 illustrates examples of execution unit(s) circuitry.

FIG. 8 illustrates examples of execution unit(s) circuitry, such as execution unit(s) circuitry 762 of FIG. 7(B). As illustrated, execution unit(s) circuitry 762 may include one or more ALU circuits 801, optional vector/single instruction multiple data (SIMD) circuits 803, load/store circuits 805, branch/jump circuits 807, and/or Floating-point unit (FPU) circuits 809. ALU circuits 801 perform integer arithmetic and/or Boolean operations. Vector/SIMD circuits 803 per- form vector/SIMD operations on packed data (such as SIMD/vector registers). Load/store circuits 805 execute load and store instructions to load data from memory into regis- ters or store from registers to memory. Load/store circuits 805 may also generate addresses. Branch/jump circuits 807 cause a branch or jump to a memory address depending on the instruction. FPU circuits 809 perform floating-point arithmetic. The width of the execution unit(s) circuitry 762 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Figure 9:
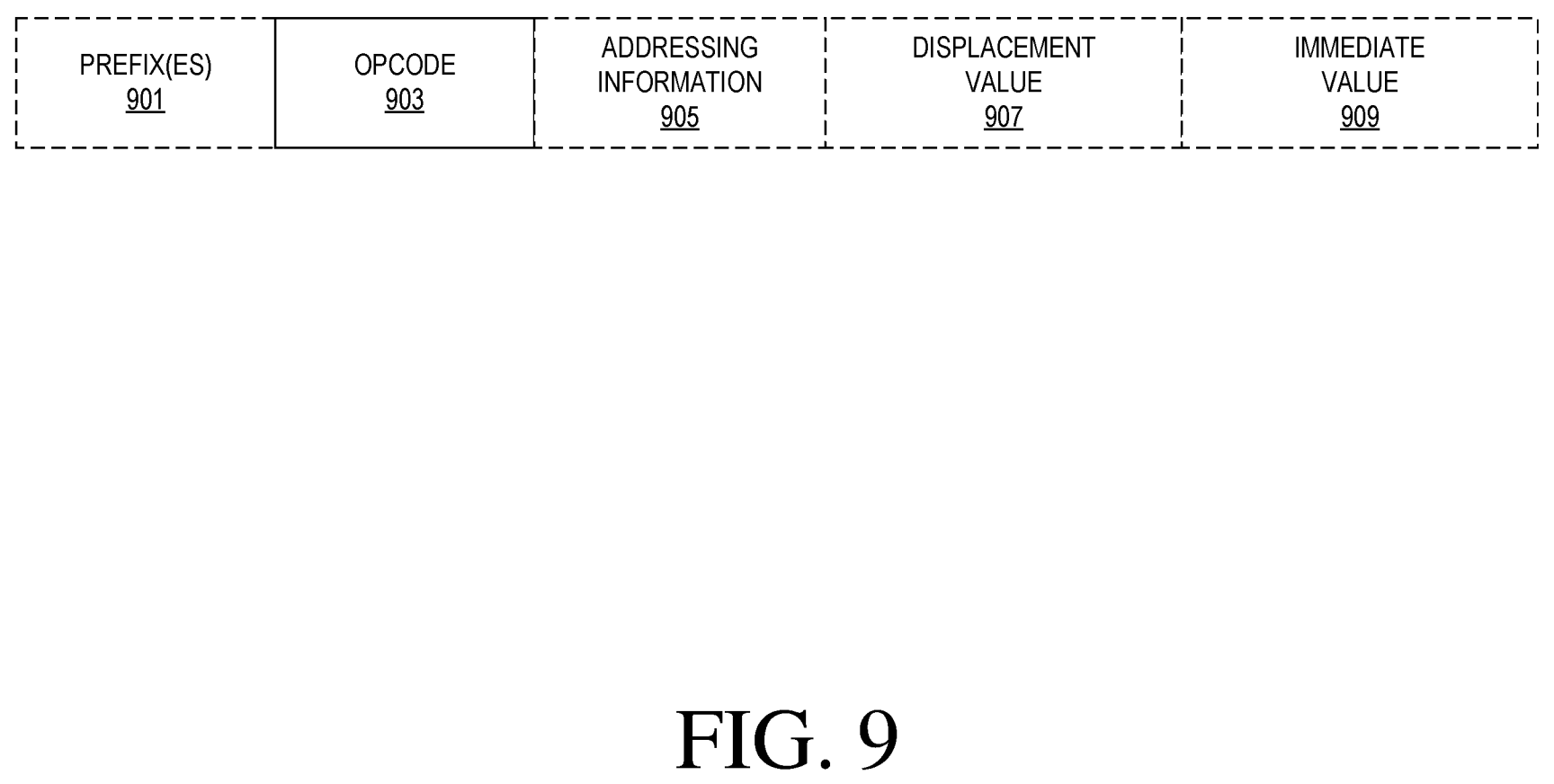

FIG. 9 illustrates examples of an instruction format. As illustrated, an instruction may include multiple components including, but not limited to, one or more fields for: one or more prefixes 901, an opcode 903, addressing information 905 (e.g., register identifiers, memory addressing informa- tion, etc.), a displacement value 907, and/or an immediate value 909. Note that some instructions utilize some or all the fields of the format whereas others may only use the field for the opcode 903. In some examples, the order illustrated is the order in which these fields are to be encoded, however, it should be appreciated that in other examples these fields may be encoded in a different order, combined, etc.

The prefix(es) field(s) 901, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock opera- tions, and/or to change operand (e.g., 0x66) and address sizes (e.g., 0x67). Certain instructions require a mandatory prefix (e.g., 0x66, 0xF2, 0xF3, etc.). Certain of these pre- fixes may be considered "legacy" prefixes. Other prefixes, one or more examples of which are detailed herein, indicate, and/or provide further capability, such as specifying particu- lar registers, etc. The other prefixes typically follow the "legacy" prefixes.

The opcode field 903 is used to at least partially define the operation to be performed upon a decoding of the instruc- tion. In some examples, a primary opcode encoded in the opcode field 903 is one, two, or three bytes in length. In other examples, a primary opcode can be a different length. An additional 3-bit opcode field is sometimes encoded in another field.

Figure 10:
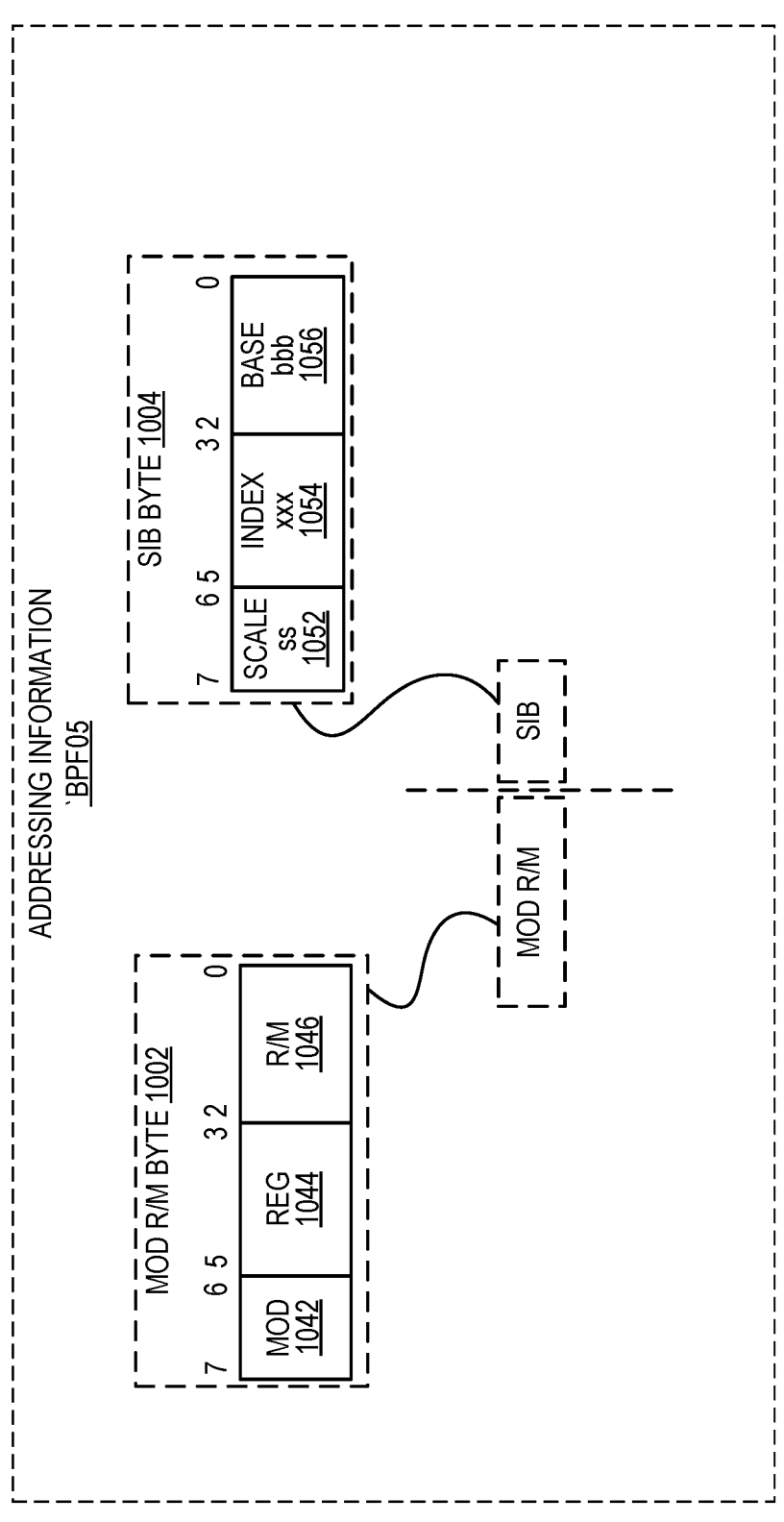
FIG. 10 illustrates examples of an addressing information field.

The addressing information field 905 is used to address one or more operands of the instruction, such as a location in memory or one or more registers. FIG. 10 illustrates examples of the addressing information field 905. In this illustration, an optional MOD R/M byte 1002 and an optional Scale, Index, Base (SIB) byte 1004 are shown. The MOD R/M byte 1002 and the SIB byte 1004 are used to encode up to two operands of an instruction, each of which is a direct register or effective memory address. Note that both of these fields are optional in that not all instructions include one or more of these fields. The MOD R/M byte 1002 includes a MOD field 1042, a register (reg) field 1044, and R/M field 1046.

The content of the MOD field 1042 distinguishes between memory access and non-memory access modes. In some examples, when the MOD field 1042 has a binary value of 11 (11b), a register-direct addressing mode is utilized, and otherwise a register-indirect addressing mode is used.

The register field 1044 may encode either the destination register operand or a source register operand or may encode an opcode extension and not be used to encode any instruc- tion operand. The content of register field 1044, directly or through address generation, specifies the locations of a source or destination operand (either in a register or in memory). In some examples, the register field 1044 is supplemented with an additional bit from a prefix (e.g., prefix 901) to allow for greater addressing.

The R/M field 1046 may be used to encode an instruction operand that references a memory address or may be used to encode either the destination register operand or a source register operand. Note the R/M field 1046 may be combined with the MOD field 1042 to dictate an addressing mode in some examples.

The SIB byte 1004 includes a scale field 1052, an index field 1054, and a base field 1056 to be used in the generation of an address. The scale field 1052 indicates a scaling factor. The index field 1054 specifies an index register to use. In some examples, the index field 1054 is supplemented with an additional bit from a prefix (e.g., prefix 901) to allow for greater addressing. The base field 1056 specifies a base register to use. In some examples, the base field 1056 is supplemented with an additional bit from a prefix (e.g., prefix 901) to allow for greater addressing. In practice, the content of the scale field 1052 allows for the scaling of the content of the index field 1054 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 907 provides this value. Additionally, in some examples, a displacement factor usage is encoded in the MOD field of the addressing information field 905 that indicates a compressed displacement scheme for which a displacement value is calculated and stored in the displacement field 907.

In some examples, the immediate value field 909 specifies an immediate value for the instruction. An immediate value may be encoded as a 1-byte value, a 2-byte value, a 4-byte value, etc.

In this description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes 1 includes an apparatus comprising: decoder circuitry to decode a single instruction, the single instruction to include a field for an identifier of a first source operand, a field for an identifier of a second source operand, a field for an identifier of a destination operand, and a field for an opcode, and execution circuitry to execute the decoded instruction according to the opcode to: write the first source operand to a memory location identified by the second source operand; compute an index into a control array based at least in part on the destination operand and an element size of the control array; and determine whether to exit to a hypervisor of a Virtual Machine (VM) based at least in part on data stored at a location in the control array, wherein the location is to be identified by the computed index.

Example 2 includes the apparatus of example 1, wherein the field for the identifier of the first source operand is to identify a value. Example 3 includes the apparatus of example 1, wherein the field for the identifier of the second source operand is to identify a memory address. Example 4 includes the apparatus of example 1, wherein a first Virtual Central Processing Unit (VCPU) is to execute a first instruction to enable execution of the single instruction and cause the first VCPU to enter a low power consumption state. Example 5 includes the apparatus of example 4, wherein the first instruction comprises a Monitor Wait (MWAIT) instruction. Example 6 includes the apparatus of example 4, wherein a second VCPU is to execute the single instruction in response to a determination that execution of the single instruction is enabled.

Example 7 includes the apparatus of example 6, wherein the second VCPU is to cause the first VCPU to exit the low power consumption state in response to detection of an exit event. Example 8 includes the apparatus of example 1, wherein the field for the identifier of the destination operand is to identify a target processor core. Example 9 includes the apparatus of example 1, wherein the field for the identifier of the destination operand is to identify an Advanced Programmable Interrupt Controller (APIC) identifier of a target processor core. Example 10 includes the apparatus of example 1, wherein a VM Control Structure (VMCS) is to store one or more of: a pointer to the control array, a control array limit, a control bit to indicate whether execution of the single instruction is enabled, and a timeout configuration setting. Example 11 includes the apparatus of example 10, wherein a first VCPU is to execute a first instruction to enable execution of the single instruction and cause the first VCPU to enter a low power consumption state, wherein the timeout configuration setting is to indicate a timeout period for the first VCPU to exit the low power consumption state.

Example 12 includes a processor comprising: decoder circuitry to decode a single instruction, the single instruction to include a first field for a value, a second field for a memory address, a third field for an identifier of a target processor core, and a fourth field for an opcode, and execution circuitry to execute the decoded instruction according to the opcode to: write the value to a memory location identified by the memory address; compute an index into a control array based at least in part on the identifier and an element size of the control array; and determine whether to exit to a hypervisor of a Virtual Machine (VM) based at least in part on data stored at a location in the control array, wherein the location is to be identified by the computed index.

Example 13 includes the processor of example 12, wherein a first Virtual Central Processing Unit (VCPU) is to execute a first instruction to enable execution of the single instruction and cause the first VCPU to enter a low power consumption state. Example 14 includes the processor of example 13, wherein the first instruction comprises a Monitor Wait (MWAIT) instruction. Example 15 includes the processor of example 13, wherein a second VCPU is to execute the single instruction in response to a determination that execution of the single instruction is enabled. Example 16 includes the processor of example 15, wherein the second VCPU is to cause the first VCPU to exit the low power consumption state in response to detection of an exit event. Example 17 includes the processor of example 13, wherein the identifier is to identify an Advanced Programmable Interrupt Controller (APIC) identifier of the target processor core. Example 18 includes the processor of example 13, wherein a VM Control Structure (VMCS) is to store one or more of: a pointer to the control array, a control array limit, a control bit to indicate whether execution of the single instruction is enabled, and a timeout configuration setting. Example 19 includes the processor of example 18, wherein a first VCPU is to execute a first instruction to enable execution of the single instruction and cause the first VCPU to enter a low power consumption state, wherein the timeout configuration setting is to indicate a timeout period for the first VCPU to exit the low power consumption state.

Example 20 includes one or more non-transitory computer-readable media comprising one or more instructions that when executed on a processor configure the processor to perform one or more operations to: decode a single instruction, the single instruction to include a field for an identifier of a first source operand, a field for an identifier of a second source operand, a field for an identifier of a destination operand, and a field for an opcode, and execute the decoded instruction according to the opcode to: write the first source operand to a memory location identified by the second source operand; compute an index into a control array based at least in part on the destination operand and an element size of the control array; and determine whether to exit to a hypervisor of a Virtual Machine (VM) based at least in part on data stored at a location in the control array, wherein the location is to be identified by the computed index.

Example 21 includes the one or more computer-readable media of example 20, wherein the field for the identifier of the first source operand is to identify a value. Example 22 includes the one or more computer-readable media of example 20, wherein the field for the identifier of the second source operand is to identify a memory address. Example 23 includes the one or more computer-readable media of example 20, further comprising one or more instructions that when executed on the processor configure the processor to perform one or more operations to cause a first Virtual Central Processing Unit (VCPU) to execute a first instruction to enable execution of the single instruction and cause the first VCPU to enter a low power consumption state. Example 24 includes the one or more computer-readable media of example 20, wherein the field for the identifier of the destination operand is to identify a target processor core. Example 25 includes the one or more computer-readable media of example 20, wherein the field for the identifier of the destination operand is to identify an Advanced Programmable Interrupt Controller (APIC) identifier of a target processor core.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In some embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Further, While various embodiments described herein use the term System-on-a-Chip or System-on-Chip ("SoC" or "SOC") to describe a device or system having a processor and associated circuitry (e.g., Input/Output ("I/O") circuitry, power delivery circuitry, memory circuitry, etc.) integrated monolithically into a single Integrated Circuit ("IC") die, or chip, the present disclosure is not limited in that respect. For example, in various embodiments of the present disclosure, a device or system can have one or more processors (e.g., one or more processor cores) and associated circuitry (e.g., Input/Output ("I/O") circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems, the various dies, tiles and/or chiplets can be physically and/or electrically coupled together by a package structure including, for example, various packaging substrates, interposers, active interposers, photonic interposers, interconnect bridges, and the like. The disaggregated collection of discrete dies, tiles, and/or chiplets can also be part of a System-on-Package ("SoP").

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
decoder circuitry to decode a single instruction, the single instruction to include a field for an identifier of a first source operand, a field for an identifier of a second source operand, a field for an identifier of a destination operand, and a field for an opcode, and
execution circuitry to execute the decoded instruction according to the opcode to:
write the first source operand to a memory location identified by the second source operand;
compute an index into a control array based at least in part on the destination operand and an element size of the control array; and
determine whether to exit to a hypervisor of a Virtual Machine (VM) based at least in part on data stored at a location in the control array, wherein the location is to be identified by the computed index.

2. The apparatus of claim 1, wherein the field for the identifier of the first source operand is to identify a value.

3. The apparatus of claim 1, wherein the field for the identifier of the second source operand is to identify a memory address.

4. The apparatus of claim 1, wherein a first Virtual Central Processing Unit (VCPU) is to execute a first instruction to enable execution of the single instruction and cause the first VCPU to enter a low power consumption state.

5. The apparatus of claim 4, wherein the first instruction comprises a Monitor Wait (MWAIT) instruction.

6. The apparatus of claim 4, wherein a second VCPU is to execute the single instruction in response to a determination that execution of the single instruction is enabled.

7. The apparatus of claim 6, wherein the second VCPU is to cause the first VCPU to exit the low power consumption state in response to detection of an exit event.

8. The apparatus of claim 1, wherein the field for the identifier of the destination operand is to identify a target processor core.

9. The apparatus of claim 1, wherein the field for the identifier of the destination operand is to identify an Advanced Programmable Interrupt Controller (APIC) identifier of a target processor core.

10. The apparatus of claim 1, wherein a VM Control Structure (VMCS) is to store one or more of: a pointer to the control array, a control array limit, a control bit to indicate whether execution of the single instruction is enabled, and a timeout configuration setting.

11. The apparatus of claim 10, wherein a first VCPU is to execute a first instruction to enable execution of the single instruction and cause the first VCPU to enter a low power consumption state, wherein the timeout configuration setting is to indicate a timeout period for the first VCPU to exit the low power consumption state.

12. A processor comprising:

decoder circuitry to decode a single instruction, the single instruction to include a first field for a value, a second field for a memory address, a third field for an identifier of a target processor core, and a fourth field for an opcode, and execution circuitry to execute the decoded instruction according to the opcode to:

write the value to a memory location identified by the memory address;

compute an index into a control array based at least in part on the identifier and an element size of the control array; and determine whether to exit to a hypervisor of a Virtual Machine (VM) based at least in part on data stored at a location in the control array, wherein the location is to be identified by the computed index.

13. The processor of claim 12, wherein a first Virtual Central Processing Unit (VCPU) is to execute a first instruction to enable execution of the single instruction and cause the first VCPU to enter a low power consumption state.

14. The processor of claim 13, wherein the first instruction comprises a Monitor Wait (MWAIT) instruction.

15. The processor of claim 13, wherein a second VCPU is to execute the single instruction in response to a determination that execution of the single instruction is enabled.

16. The processor of claim 15, wherein the second VCPU is to cause the first VCPU to exit the low power consumption state in response to detection of an exit event.

17. The processor of claim 13, wherein the identifier is to identify an Advanced Programmable Interrupt Controller (APIC) identifier of the target processor core.

18. The processor of claim 13, wherein a VM Control Structure (VMCS) is to store one or more of: a pointer to the control array, a control array limit, a control bit to indicate whether execution of the single instruction is enabled, and a timeout configuration setting.

19. The processor of claim 18, wherein a first VCPU is to execute a first instruction to enable execution of the single instruction and cause the first VCPU to enter a low power consumption state, wherein the timeout configuration setting is to indicate a timeout period for the first VCPU to exit the low power consumption state.

20. One or more non-transitory computer-readable media comprising one or more instructions that when executed on a processor configure the processor to perform one or more operations to:

decode a single instruction, the single instruction to include a field for an identifier of a first source operand, a field for an identifier of a second source operand, a field for an identifier of a destination operand, and a field for an opcode, and execute the decoded instruction according to the opcode to:

write the first source operand to a memory location identified by the second source operand;

compute an index into a control array based at least in part on the destination operand and an element size of the control array; and determine whether to exit to a hypervisor of a Virtual Machine (VM) based at least in part on data stored at a location in the control array, wherein the location is to be identified by the computed index.

21. The one or more computer-readable media of claim 20, wherein the field for the identifier of the first source operand is to identify a value.

22. The one or more computer-readable media of claim 20, wherein the field for the identifier of the second source operand is to identify a memory address.

23. The one or more computer-readable media of claim 20, further comprising one or more instructions that when executed on the processor configure the processor to perform one or more operations to cause a first Virtual Central Processing Unit (VCPU) to execute a first instruction to enable execution of the single instruction and cause the first VCPU to enter a low power consumption state.

24. The one or more computer-readable media of claim 20, wherein the field for the identifier of the destination operand is to identify a target processor core.

25. The one or more computer-readable media of claim 20, wherein the field for the identifier of the destination operand is to identify an Advanced Programmable Interrupt Controller (APIC) identifier of a target processor core.

* * * * *